United States Patent [19]
Conner et al.

[11] Patent Number: 5,879,075
[45] Date of Patent: Mar. 9, 1999

[54] AGGLUTINATION VIEWER WITH FIBER OPTIC LIGHT PIPE AND MAGNETIC MAGNIFYING MIRROR

[75] Inventors: Patrick M. Conner, Pembroke, Fla.; Duane M. Durkos, Zionsville; Ben D. Taylor, Carmel, both of Ind.

[73] Assignee: Becton Dickinson & company, Franklin Lakes, N.J.

[21] Appl. No.: 723,328

[22] Filed: Sep. 30, 1996

[51] Int. Cl.⁶ .................................................. F21V 33/00
[52] U.S. Cl. .......................... 362/551; 362/138; 362/294; 362/373
[58] Field of Search ................................ 362/26, 32, 135, 362/138, 142, 144, 282, 283, 319, 322, 398, 294, 373, 551

[56] References Cited

U.S. PATENT DOCUMENTS

| | | | |
|---|---|---|---|
| 1,350,042 | 8/1920 | Stealy | 362/139 |
| 2,176,620 | 10/1939 | Beam | 362/139 |
| 2,200,114 | 5/1940 | Konikoff | 362/144 |
| 4,225,907 | 9/1980 | Erdell | 362/398 |
| 5,353,786 | 10/1994 | Wilk | 362/32 |

*Primary Examiner*—Y. My Quach
*Attorney, Agent, or Firm*—Bruce S. Weintraub

[57] ABSTRACT

An improved apparatus for viewing agglutination of blood cells in test tubes utilizes magnetic force to hold a magnifying mirror in the desired orientation on the base portion of the viewer. The magnetically held mirror can be adjusted more quickly and easily than mirrors supported by mechanical clamping arrangements, as in previously available agglutination viewers. The improved viewer also includes an illumination source in the form of a lamp head which can be adjusted in position with respect to the base portion and magnifying mirror. In one embodiment, the lamp head is provided with illumination by means of a fiber optic cable enclosed in a flexible gooseneck-type conduit. The fiber optic cable receives light from an incandescent lamp or other light source housed in the base portion of the viewer. In a second embodiment, the lamp head contains an incandescent lamp and can be rotated about two perpendicular axes by means of an articulated structure connected to the base portion of the viewer.

18 Claims, 7 Drawing Sheets

AGGLUTINATION VIEWER WITH FIBER OPTIC LIGHT PIPE AND MAGNETIC MAGNIFYING MIRROR

FIELD OF THE INVENTION

The present invention relates generally to laboratory apparatus, and is particularly concerned with an illuminating and magnifying apparatus for viewing the agglutination of blood cells in a sample tube.

BACKGROUND OF THE INVENTION

Blood cell agglutination viewers are commonly used in medical laboratories, blood banks, and similar types of facilities. After a test tube containing a blood sample is centrifuged, a laboratory or medical technician "reads" the tube by examining the agglutination of cells in the bottom of the tube. The agglutination viewer includes a light source and a magnifying mirror to assist in this process. By positioning the sample tube between the light source and mirror, any agglutination which has occurred in the bottom of the tube can be visually detected.

In an existing type of agglutination viewer sold by Becton Dickinson and Company, the assignee of the present invention, the magnifying mirror that is used to view agglutination in the sample tube is supported by an adjustable clamp mounted on the base portion of the viewer. Ball joints allow the mirror to be adjusted to the desired orientation, and a thumb screw is used to lock the clamp in the desired position. Although this is an effective arrangement, the mechanical clamp assembly is somewhat difficult to adjust and can become worn after prolonged use.

Another disadvantage of the known agglutination viewer has to do with the nature of the illumination source, which consists of an incandescent lamp and shade assembly that is suspended over the base portion of the viewer by means of a flexible metal gooseneck. Although the flexible gooseneck is advantageous in allowing the light source to be adjusted to any desired position, the incandescent bulb and shade assembly can become hot after an extended period of operation. This is undesirable not only because of the discomfort that may be experienced by the user when adjusting the position of the light source, but also because prolonged high temperatures can lead to heat-induced failures in the lamp socket assembly. The need to provide electrical wiring in a movable part of the viewer (i.e., in the gooseneck and shade assembly), is also disadvantageous since repeated adjustment of the lamp position can cause this wiring to become broken or disconnected.

In view of the foregoing disadvantages and limitations of the prior art, it is an object of the present invention to provide an improved agglutination viewer in which adjustments in the orientation of the magnifying mirror can be carried out quickly and easily, without the need to manipulate a mechanical clamping assembly.

A further object of the invention is to provide an improved agglutination viewer in which the source of illumination does not become hot to the touch, so that it can be manipulated without discomfort even after the viewer has been in operation for an extended period of time.

A still further object of the present invention is to provide an improved agglutination viewer in which electrical wiring does not have to be provided in the portion of the illumination source which is moved or manipulated by the user, thereby avoiding problems due to wire breakage and the like.

It is a still further object of the invention to provide an improved agglutination viewer in which the illumination source is lighter in weight and more flexible than in the prior art, so that it can be adjusted more easily and accurately.

SUMMARY OF THE INVENTION

In accordance with the present invention, the disadvantages and limitations of the prior art are substantially avoided by providing an improved agglutination viewer in which magnetic force is used to retain the magnifying mirror in a selected orientation on the base portion of the viewer and a fiber optic cable is used as the illumination source. By virtue of the magnetic mirror holding arrangement, the need for a mechanical clamp assembly is eliminated and precise adjustments in the orientation of the mirror can be made more quickly and easily. The use of a fiber optic cable as the illumination source eliminates the problem of high surface temperatures on the portion of the viewer that are manipulated by the user, since the incandescent lamp which provides light to the fiber optic cable can be housed at a protected location within the base portion of the viewer. The use of a fiber optic cable also allows the movable portion of the illumination source to be made physically lighter and more flexible than would be possible with a conventional incandescent bulb and shade assembly.

In one aspect, therefore, the present invention is directed to an agglutination viewer which comprises a base portion, a magnifying mirror carried by the base portion, and an illumination device carried by the base portion for providing illumination to a sample tube while the sample tube is held in proximity to the mirror for viewing. The mirror is adjustable in orientation with respect to the base portion and is held in a desired orientation by magnetic attraction to the base portion. In a preferred embodiment of the invention, the mirror is held in the desired orientation by means of a magnet that is disposed within a hollow interior part of the base portion.

In another aspect, the present invention is directed to an agglutination viewer which comprises a base portion, a magnifying mirror carried by the base portion and adjustable in position with respect to the base portion, and an illumination device carried by the base portion for providing illumination to a sample tube while the sample tube is held in proximity to the mirror for viewing. The illumination device comprises a lamp head that is adjustably supported with respect to the base portion of the viewer by means of a flexible conduit, and a light source contained within the base portion. The light source is optically coupled to the lamp head by means of a fiber optic cable contained within the flexible conduit. In the preferred embodiment of the invention, the light source comprises an incandescent lamp, and the base portion contains a heat sink for dissipating heat from the incandescent lamp during operation of the viewer.

In a still further aspect, the present invention is directed to an agglutination viewer which comprises a base portion having an open cavity with generally spherical walls, a cup-like member having a generally spherical outer surface conforming to the generally spherical walls of the cavity, a magnifying mirror disposed in the cup-like member, and an illumination device carried by the base portion for providing illumination to a sample tube while the sample tube is held in proximity to the mirror for viewing. The cup-like member is receivable in the cavity, such that the orientation of the mirror with respect to the base portion of the viewer is adjustable by movement of the cup-like member within the cavity. In a preferred embodiment of the invention, the cup-like member is held in a desired orientation with respect to the base portion of the viewer by means of magnetic force.

BRIEF DESCRIPTION OF THE DRAWINGS

The various objects, advantages and novel features of the invention will be more readily appreciated from the following detailed description when read in conjunction with the appended drawing figures, in which.

Throughout the drawings, like reference numerals will be understood to refer to like parts and components.

DETAILED DESCRIPTION OF THE PREFERRED EMBODIMENTS

Figure 1:
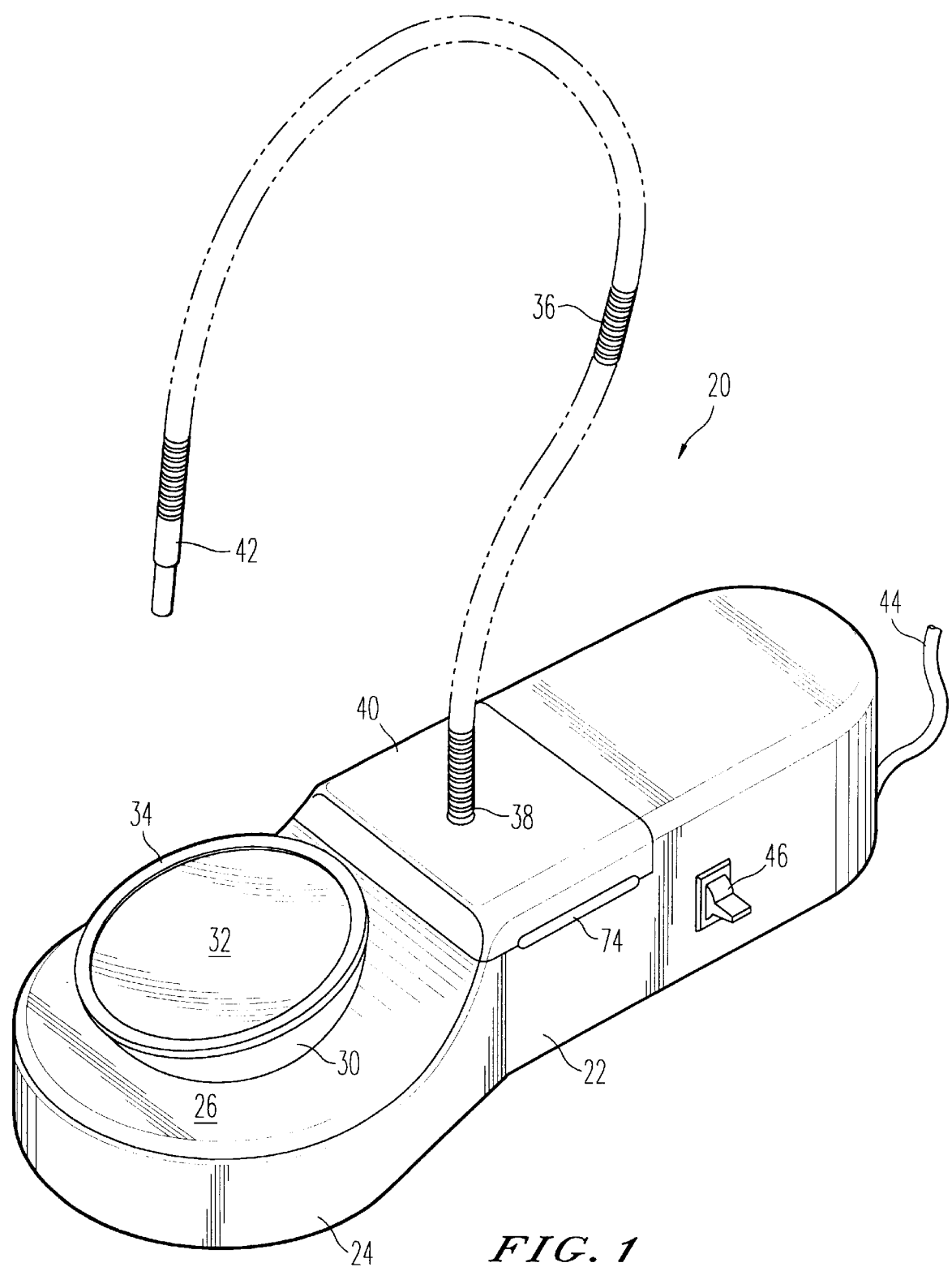
FIG. 1 is perspective view of an agglutination viewer constructed in accordance with a first embodiment of the present invention.
Figure 2:
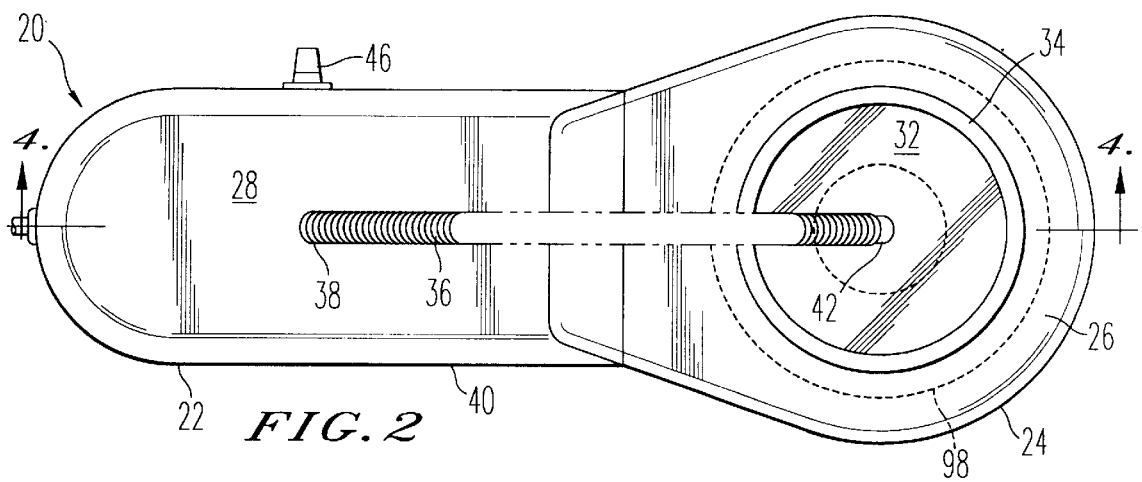
FIG. 2 is a top view of the agglutination viewer of FIG. 1.
Figure 3:
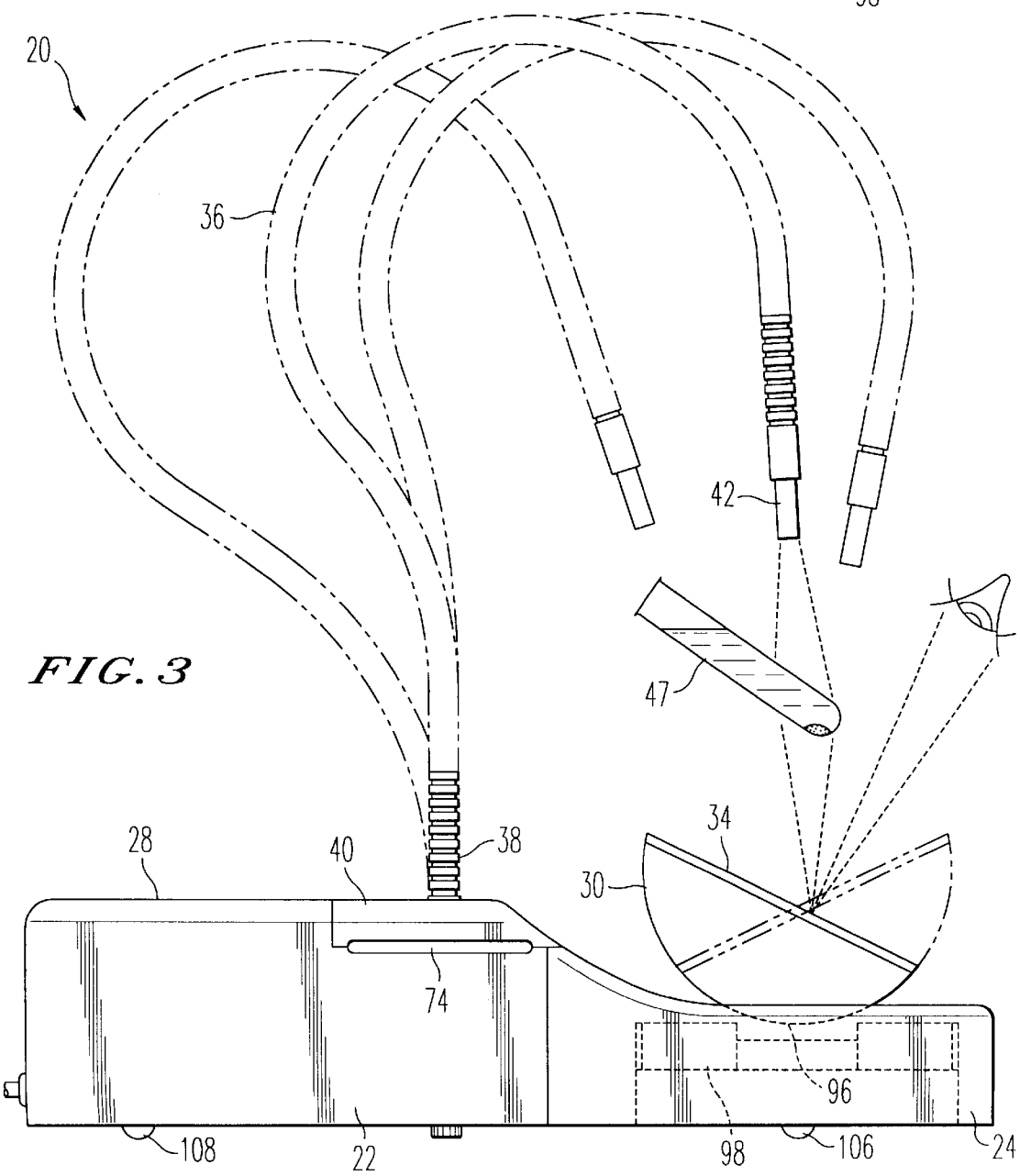
FIG. 3 is a side view of the agglutination viewer of FIG. 1.

An agglutination viewer 20 in accordance with a first embodiment of the present invention is illustrated in FIGS. 1–3. The agglutination viewer 20 is designed for use on a laboratory benchtop in a hospital, medical laboratory, blood bank or the like, includes a base portion 22 which is preferably made of metal or high-impact plastic. The forward part 24 of the base portion 22 is somewhat wider than the remainder of the base portion 22, as shown, and is provided with an upper surface 26 which is recessed downwardly with respect to the upper surface 28 of the rear part of the base portion 22. The surface 26 serves as a support for a hollow steel cup-like member 30, which is approximately in the shape of a hemisphere as shown. The cup-like member 30 is removable from the viewer 20 and is held by magnetic attraction to the surface 26 by means of a permanent magnet mounted in the base portion 22, as will be described in detail hereinafter, and has a circular magnifying mirror 32 fitted in its upwardly-facing opening. A plastic retaining ring 34 supports the outer edges of the mirror 32 and provides tight engagement with the upper walls of the cup-like member 30. The plastic ring is bonded to the cup-like member 30 by means of an adhesive. The magnifying mirror 32 is of a conventional type and is characterized by a slight concavity in its upper surface, sufficient to provide a magnification of approximately two times (2×) in the preferred embodiment.

Merely by way of example, but not by way of limitation, the base portion 22 of the agglutination viewer 20 may be approximately 11.5 inches in length, 4.6 inches in width and 2.7 inches in height. The diameter of the cup-like member may be approximately 3.5 inches, and the diameter of the mirror 32 may be approximately 3.0 inches.

With continued reference to FIGS. 1–3, the base portion 22 of the agglutination viewer 20 serves as a mounting point for one end of a flexible metal gooseneck 36 which provides illumination for the sample tubes that are viewed in the magnifying mirror 32. The lower end 38 of the gooseneck 36 passes through a removable cover 40 at the top of the base portion 22, and is supported by a heat sink structure within the hollow interior of the base portion 22 as will be described hereinafter. The opposite end of the gooseneck 36 terminates in a stepped metal collar or fitting 42 which serves as a lamp head through which light emerges to illuminate the sample tubes. An fiber optic cable is contained within the gooseneck 36 and serves to transmit light from an incandescent lamp (or other light source) within the base portion 22 to the open end of the lamp head 42. The light source within the base portion 22 is provided with electrical power by means of an AC power cord that enters through the rear of the base portion 22. A toggle-type power switch 46 is provided on the side of the base portion 22 to allow the light source to be switched on and off by the user when desired.

In use, a test tube 47 containing a blood sample is manually held by a laboratory technician at a position between the lamp head 42 at the free end of the gooseneck 36 and the magnifying mirror 32. The position and orientation of the lamp head 42 and the orientation of the mirror 32 are then adjusted so that any agglutination in the bottom of the test tube can be viewed in the mirror 32. Adjustment of the orientation of the mirror 32 is carried out by manipulating the steel cup-like member 30 until it is positioned at the desired angle, as suggested by the solid-line and phantom-line positions of the cup-like member 30 in FIG. 3. As will be apparent, the cup-like member 30 can be manipulated so that the mirror 32 occupies any of an essentially infinite number of planes which are angularly displaced from (or, if desired, parallel to) the surfaces 26 and 28 of the base portion 22. Once adjusted, the cup-like member 30 (and hence the mirror 32) is held firmly in the selected orientation by virtue of the magnetic attraction between the cup-like member 30 and the forward part 24 of the base portion 22. Adjustment of the illumination source is accomplished by grasping and redirecting the gooseneck 36 so that the lamp head 42 occupies the desired position and points in the desired direction. It will be apparent that the gooseneck 36 can be made to assume virtually any desired configuration, due to its own flexibility and the flexibility of the fiber optic cable contained within it.

Figure 4:
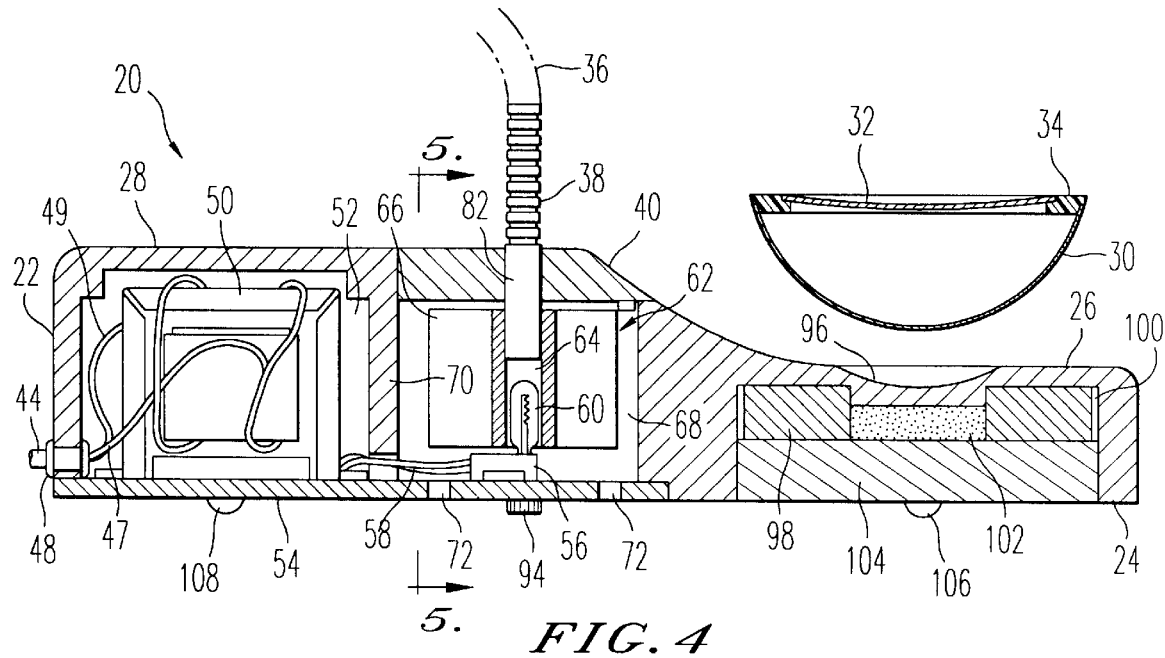
FIG. 4 is a longitudinal sectional view of the base portion of the agglutination viewer of FIGS. 1–3, taken along the line 4—4 in FIG. 2.
Figure 5:
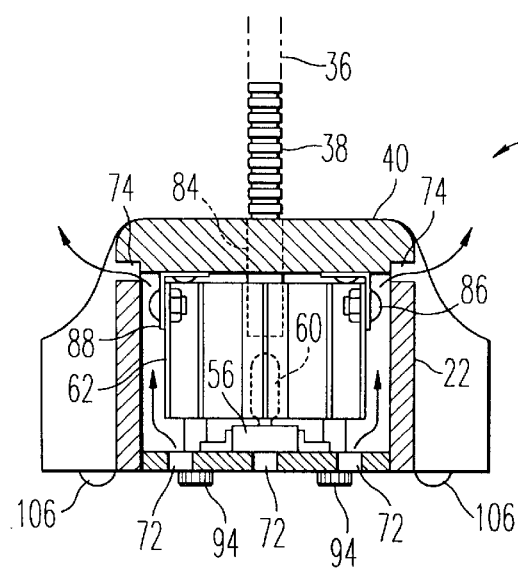
FIG. 5 is a transverse sectional view of the base portion of the agglutination viewer of FIGS. 1–4, taken along the line 5—5 in FIG. 4.
Figure 6:
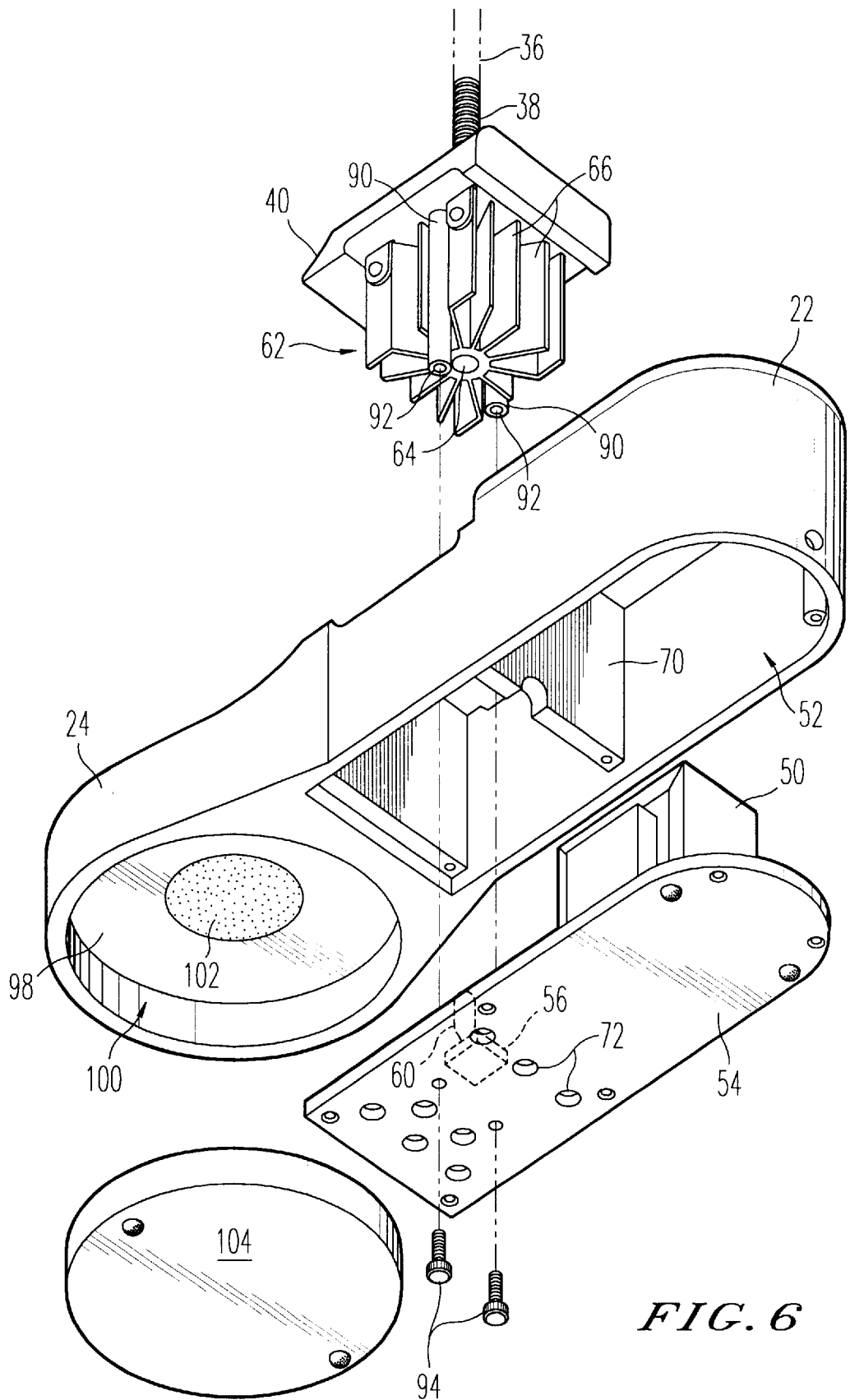
FIG. 6 is an exploded view of the base portion of the agglutination viewer of FIGS. 1–5.

FIGS. 4–6 illustrate the internal details of the base portion 22 of the agglutination viewer 20. The AC power cord 44 enters the rear of the base portion 22 through a grommet or strain relief device 48, and the line and neutral conductors 47 and 49 of the power cord are connected to the primary winding of a step-down transformer 50 housed in a cavity 52 within the base portion 22. The step-down transformer is mounted on an insulating board or plate 54 which serves as a bottom closure for the base portion 22. Also affixed to the board 54, at a position forward of the step-down transformer 50, is a lamp socket 56. Wires 58 connect the lamp socket 56 to the secondary winding of the step-down transformer 50, so that the lamp socket 56 receives an AC voltage lower than the incoming AC line voltage. In a preferred embodiment, the step-down transformer provides an output voltage to the lamp socket 56 of 12 volts AC (at 2 amperes) when the input line voltage is equal to 120 volts AC. (In alternative embodiments, the step-down transformer may be provided as a separate plug-in unit at the receptacle end of the power cord 44, in order to reduce the size of the base portion 22.) The socket 56 receives a removable incandescent lamp 60, which is preferably of the tungsten halogen type. Tungsten halogen lamps produce a whiter light than ordinary incandescent lamps, which is desirable for the purposes contemplated by the present invention, and also produce a greater light output for a lamp of a given physical size. Because tungsten halogen lamps generate significant amounts of heat, the lamp 60 is enclosed in a finned aluminum heat sink 62. The configuration of the heat sink 62 can be appreciated from FIG. 6, in which the heat sink 62 is shown removed from the base portion 22. As will be apparent, the heat sink 62 is formed with a central aperture 64, which is cylindrical in shape and oriented vertically, for loosely receiving the lamp 60. In this way, heat radiated from the lamp 60 is absorbed by the inner walls of the aperture 64 and conducted to the radial fins 66 of the heat sink. The heat sink 62, lamp 60 and socket 56 are all enclosed in a cavity 68 found within the base portion 22 of the agglutination viewer 20, at a location forward of the cavity 52. The cavity 68 is separated from the cavity 52 by means of a partition 70. The air in the cavity 68 is heated by radiation and convection from the fins 66 of the heat sink 62. In order to allow the heated air to escape from the cavity 68, holes 72 are formed in the bottom plate 54 and gaps 74 are provided between the lateral edges of the cover 40 and the adjacent vertical walls of the base portion 22. The holes 72 and gaps 74 allow a connective air current to be maintained through the cavity 68, thereby allowing the heat dissipated by the heat sink 62 to be vented to the ambient atmosphere. By virtue of this arrangement, the tungsten halogen lamp 60 can be confined to the interior of the base portion 22 without giving rise to an undesirable build-up of heat. In this location, the lamp 60 is both protected from damage and prevented from raising the temperature of surfaces that are touched by the user during normal operation of the agglutination viewer 20.

Figure 7:
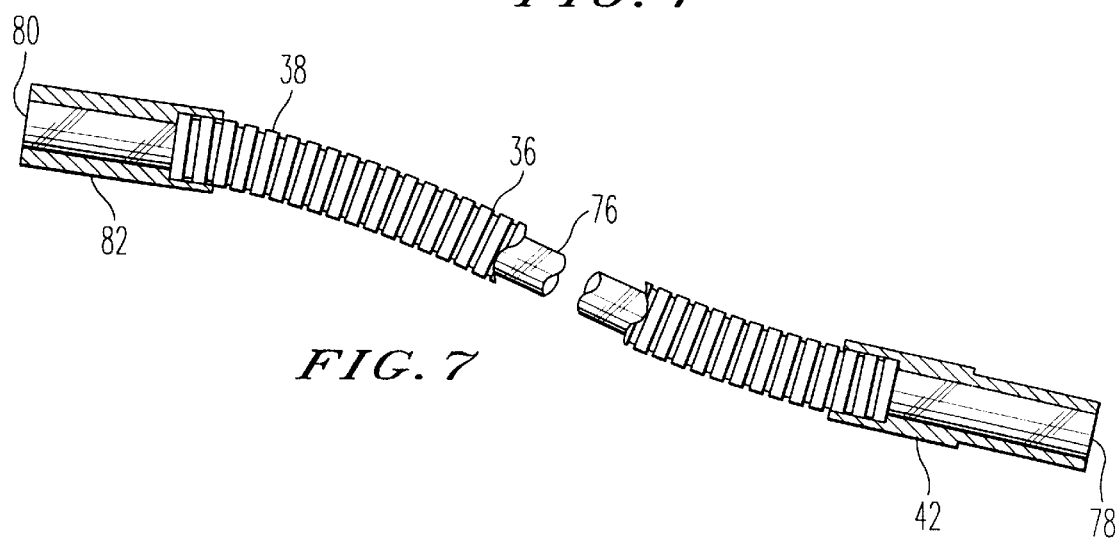
FIG. 7 is an enlarged view, partially in section, of the flexible gooseneck conduit that encloses the fiber optic cable used in the embodiment of FIGS. 1–6.

The detailed construction of the flexible metal gooseneck 36 is illustrated in FIG. 7. A fiber optic cable 76 having opposed ends 78 and 80 is encased within the flexible gooseneck 36. The metal lamp head 42 is press-fitted to the free end of the gooseneck 36 and to the projecting portion of the fiber optic cable 76. A shade (not shown) may be provided on the lamp head 42, if desired. At the opposite end 38 of the gooseneck 36, a cylindrical metal collar 82 is press-fitted in a similar manner to the flexible gooseneck 36 and to the projecting portion of the fiber optic cable 76. The metal collar 82 provides a mounting termination for attaching the gooseneck 36 to the base portion 22 of the agglutination viewer 20. This will be evident by referring again to FIGS. 4–6, from which it can be seen that the metal collar 82 passes through a hole 84 in the top of the cover 40 and extends into the upper portion of the aperture 64 of the heat sink 62. The metal collar 82 is tightly press-fitted into the aperture 64, so that the heat sink 62 effectively serves as an anchor or support for the flexible gooseneck 36. The heat sink 62 is affixed by means of screws 86 and brackets 88 to the underside of the cover 40. The cover 40 is, in turn, removably affixed to the bottom plate 54 by means of a pair of elongated metal standoffs 90 which extend vertically between adjacent fins 66 of the heat sink 62. Threaded holes 92 are formed axially in the bottoms of the standoffs 90, and are engaged by thumb screws 94 which pass through holes in the bottom plate 54. In this manner, the heat sink 64 and the cover 40 are both anchored to the bottom plate 54. The bottom plate 54 is itself affixed to the base portion 22 of the agglutination viewer 20 by means of screws or other attachment means (not shown).

By virtue of the arrangement described above, the user can gain access to the lamp 60 for inspection or replacement simply by removing the thumb screws 94. When these screws are removed, the cover 40, heat sink 62 and gooseneck 34 can be removed as a unit as shown in FIG. 6, thereby exposing the lamp 60. (The bottom plate 54 has also been shown removed from the base portion 22 in FIG. 6 for clarity, although this would not result from removal of the thumb screws 94 unless the screws securing the bottom plate 54 to the base portion 22 were also removed.) The lamp 60 can then be inspected or replaced if necessary, and the integrity of the wiring to the socket 56 can also be checked. When the cover 40, heat sink 62 and gooseneck 36 are reinstalled in the position shown in FIG. 4, it will be observed that the end 80 of the optical fiber cable 76 (visible in FIG. 7) directly faces the lamp 60 within the aperture 64 of the heat sink 62. This results in maximum coupling of light from the lamp 60 to the optical fiber cable 76.

A suitable optical fiber cable 76 for use in the present invention is available from Edmund Scientific Company of Barrington, N.J. The optical fiber material may be either glass or a synthetic material. The individual fibers of the cable are randomly oriented and the fiber ends are broken rather than ground and polished.

The details of the magnetic holding arrangement used for the cup-like member 30 will be readily understood from FIGS. 4 and 6. As shown in FIG. 4, the cup-like member 30 is provided in the form of a hollow steel hemisphere (preferably coated to resist corrosion) which receives the magnifying mirror 32 and the plastic retaining ring 34. The upper surface 26 of the forward part 24 of the base portion 22 is formed with a shallow spherical depression or cavity 96 which has the same spherical radius as the cup-like member 30. The cavity 96 thereby provides a spherical seating surface which conforms closely to the spherical outer surface of the cup-like member 30, and thus locates and supports the mirror 32 at the proper position on the agglutination viewer 20. As described earlier, the orientation of the mirror 32 may be changed by tilting the cup-like member 30 in the desired direction and by the desired amount. Regardless of the orientation of the mirror 32, a portion of the outer surface of the cup-like member 30 will always be received in and supported by the conforming cavity 96. In order to retain the cup-like member 30 within the cavity 96, a ring-shaped permanent magnet 98 is affixed within a cylindrical cavity 100 formed in the underside of the forward part 24 of the base portion 22. The ring-shaped magnet 98 is oriented so that it is coaxial with the cavity 96 and cup-like member 30, as shown in FIG. 4. The center of the ring-shaped magnet is filled by a non-magnetic insert 102, and the bottom of the cavity 100 is closed off by a closure plate 104. The closure plate 104 is provided with rubber or plastic feet 106 on its underside to support the forward part 24 of the base portion 22, and similar feet 108 are provided at the rear of the base portion 22 on the underside of the bottom plate 54.

It will be apparent that the desired magnetic holding force between the cup-like member 30 and the cavity 96 may be obtained through arrangements other than the one shown. For example, a permanent magnet may be provided in the cup-like member 30 rather than in the base portion 22, and in that event a magnetically attractable material may be provided in or beneath the cavity 96. Alternatively, both the cup-like member 30 and the base portion 22 may be provided with magnets. Electromagnets can be used in lieu of permanent magnets if desired, although permanent magnets are preferred.

A modified agglutination viewer 110 constructed in accordance with a second embodiment of the present invention is illustrated in FIGS. 8–13. This embodiment is similar to the previous embodiment in that it includes a base portion 112, the forward portion of which defines an upwardly-facing surface 116 for supporting a separate cup-like member 118 made of steel or other magnetically attractable material. The cup-like member is shown in detail in FIG. 13 and is similar to that of the previous embodiment in that it carries a concave magnifying mirror 120 by means of a plastic retaining ring 122. The cup-like member 118 is held by magnetic force in a shallow spherical cavity 124 formed on the surface 116. The magnetic force is supplied by a ring-shaped permanent magnet 126 (visible in FIGS. 9 and 11) disposed coaxially with the cavity 124 and cup-like member 118 in a cavity formed in the underside of the forward part 114 of the base portion 112. Thus, adjustment of the orientation of the magnifying mirror 120 can be carried out by tilting the cup-like member 118 in the same manner as in the embodiment of FIGS. 1–7, as suggested by the solid-line and phantom-line positions of the cup-like member 118 shown in FIG. 11.

Figure 8:
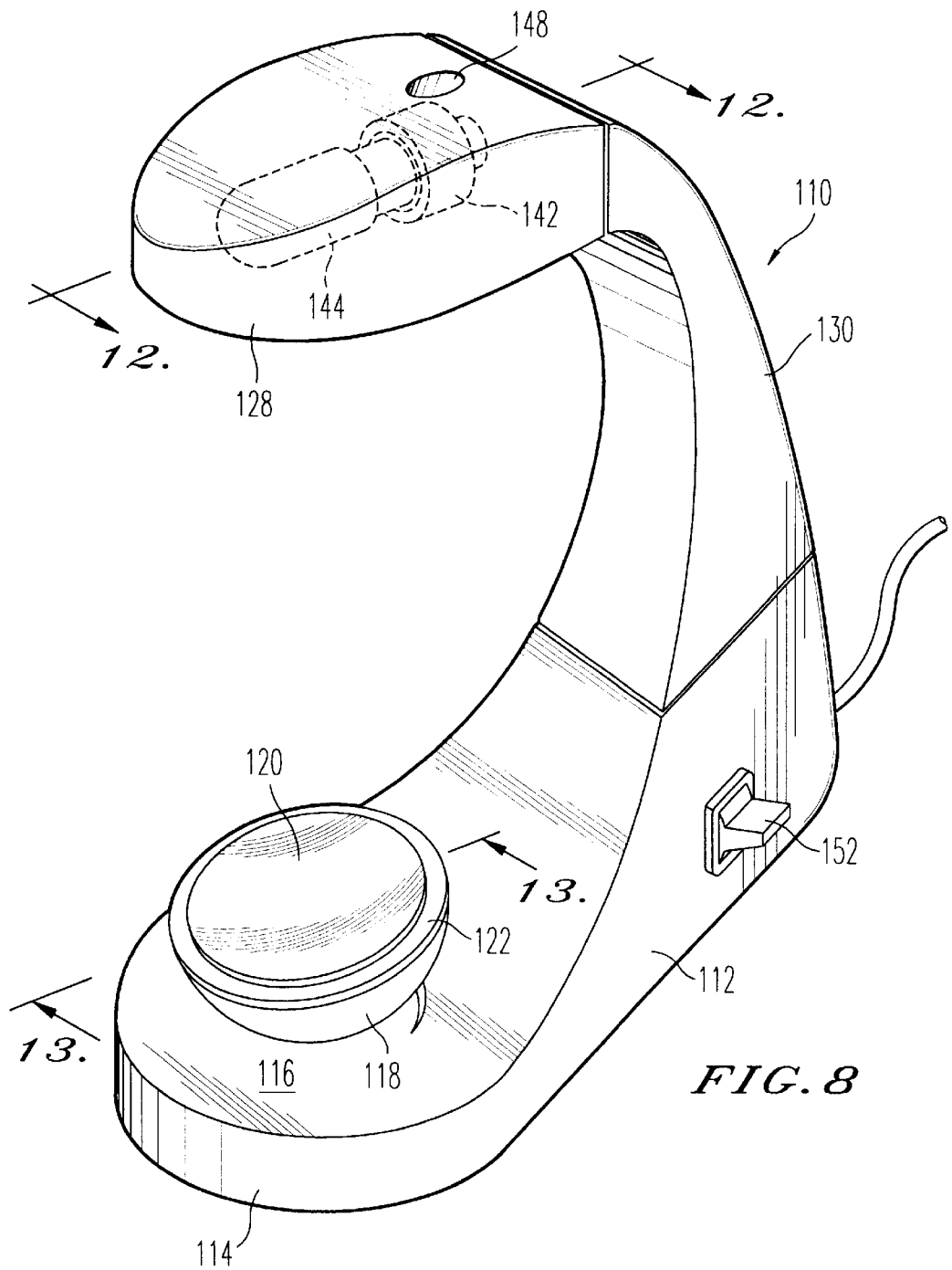
FIG. 8 is a perspective view of an agglutination viewer constructed in accordance with a second embodiment of the present invention.
Figure 13:
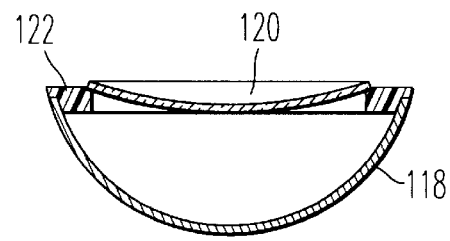
FIG. 13 is a sectional view taken along the line 13—13 in FIG. 8, illustrating the details of the mirror mounting assembly used in the embodiment of FIGS. 8–12.
Figure 9:
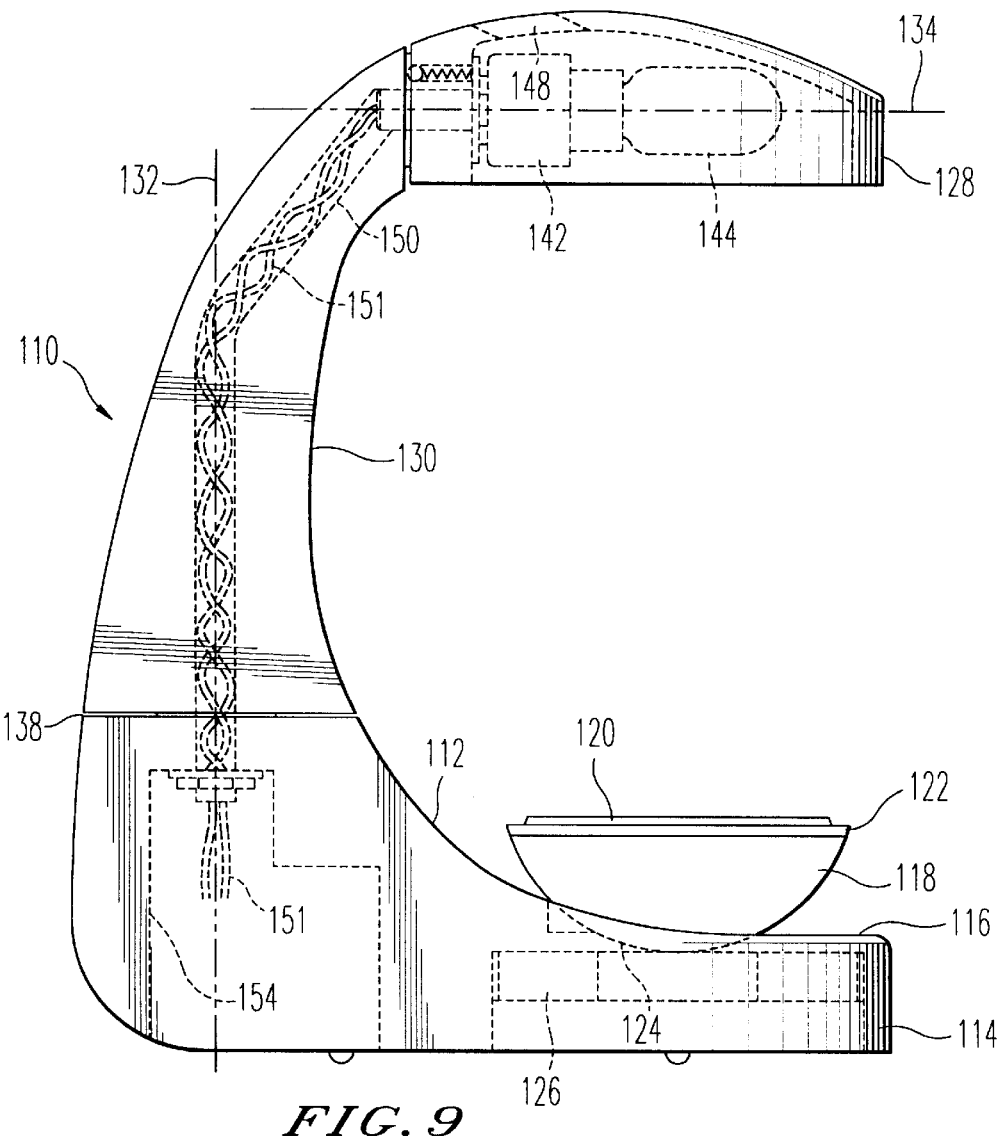
FIG. 9 is a side view of the agglutination viewer of FIG. 8, with certain internal components shown in dashed lines.
Figure 10:
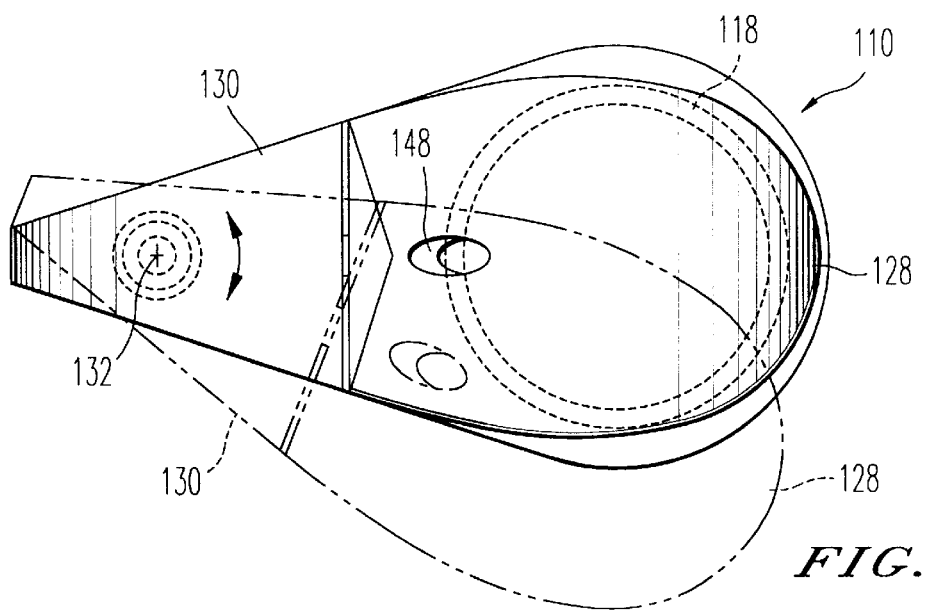
FIG. 10 is a top view of the agglutination viewer of FIGS. 8 and 9, illustrating the manner in which the lamp head can swivel from side to side about a vertical axis.
Figure 11:
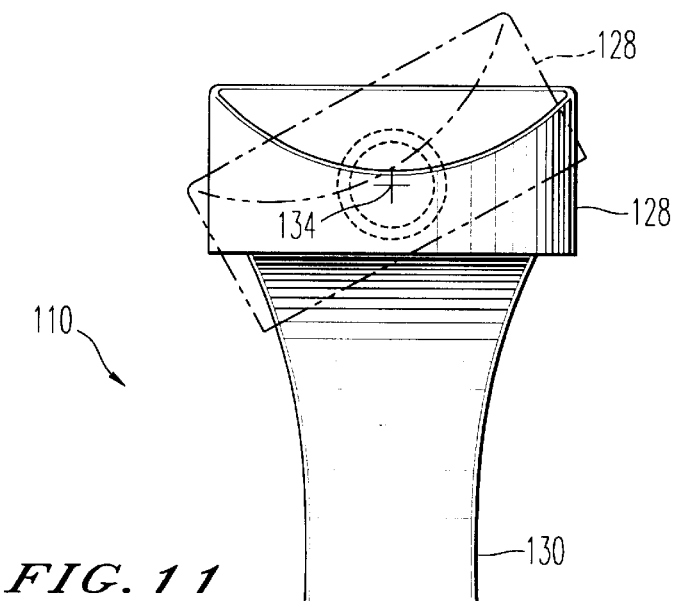
FIG. 11 is a front view of the agglutination viewer of FIGS. 8–10, illustrating the manner in which the lamp head can swivel about a horizontal axis.
Figure 12:
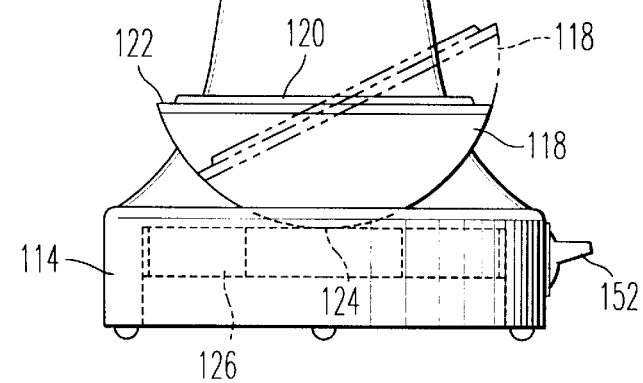
FIG. 12 is a sectional view taken along the line 12—12 in FIG. 8, illustrating the details of the lamp head used in the embodiment of FIGS. 8–11.
Figure 12:
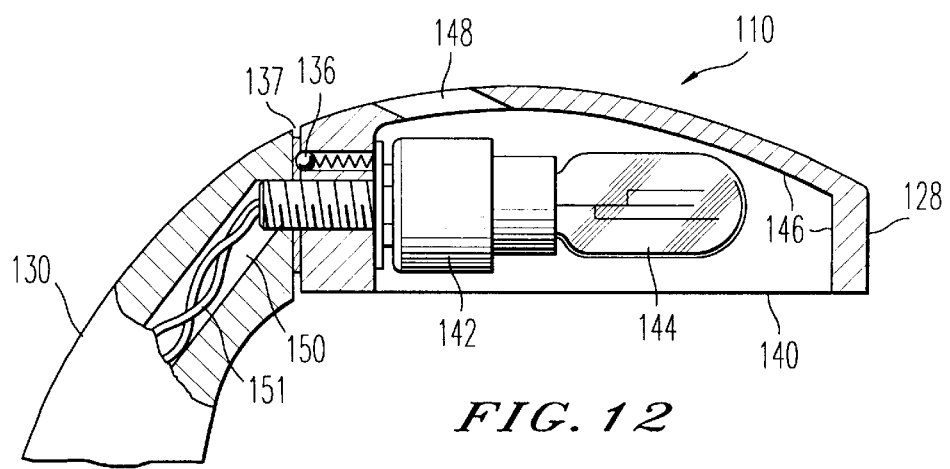

The modified agglutination viewer 110 of FIGS. 8–13 differs from that of FIGS. 1–7 primarily in that the incandescent light source is not housed in the base portion 112, and the flexible gooseneck 36 of the previous embodiment is not employed. Instead, the agglutination viewer 110 of FIGS. 8 13 provides illumination for the reading of sample tubes by means of an articulated structure consisting of a pivotable, generally horizontal incandescent lamp head 128 and a pivotable, generally vertical support arm 130. The support arm 130 extends upwardly from the rear part of the base portion 112, and is pivotable about a vertical axis 132 (visible in FIGS. 9 and 10) with respect to the base portion 112. The lamp head 128 is carried by the support arm 130 and is pivotable about a horizontal axis 134 (visible in FIGS. 9 and 11) with respect to the support arm 130. A spring-loaded ball detent 136, shown in FIG. 12, is provided in the gap 137 between the lamp head 128 and the adjacent surface of the support arm 130 in order to hold these components in their normal (undisplaced) positions relative to each other. A similar ball detent (not shown) is preferably provided in the gap 138 between the support arm 130 and the base portion 112 to perform a similar function for the support arm 130. Thus, when both ball detents are engaged, the relative positions of the base portion 112, support arm 130 and lamp head 128 are as shown in FIG. 8. However, by manually exerting a slight twisting force on the lamp head 128 or support arm 130 (or both), the user is able to rotate these components about their axes in order to achieve a desired position and orientation of the lamp head 128. The phantom-line positions of the lamp head 128 and support arm 130 in FIGS. 10 and 11 illustrate the manner in which these components can be adjusted.

The internal details of the lamp head 128 are shown in FIG. 12. The lamp head 128 is generally in the form of a hood or shade with a downwardly-facing opening 140. A lamp socket 142 is mounted horizontally within the lamp head 128 and receives a conventional (non-halogen) incandescent lamp 144. The interior surfaces 146 of the lamp head 128 are preferably covered with a reflective material to increase light transmission in the downward direction and to minimize heat transfer to the outer surfaces of the lamp head 128. A vent hole 148 is formed through the upper rear portion of the lamp head 128 in order to allow heated air generated by the incandescent lamp 144 to pass out of the lamp head 128. A conduit 150 (visible in FIGS. 9 and 12) is formed through the interior of the vertical support arm 130 to allow electrical wiring 151 to be routed from the base portion 112 of the agglutination viewer 110 to the lamp head 128. The base portion 112 is provided with a toggle-type power switch 152 (shown in FIG. 8) to allow the incandescent lamp 144 to be switched on and off by the user. An internal cavity 154 (visible in FIG. 9) is formed in the rear part of the base portion 112 to allow for installation of the power switch 152 and to provide a space for allowing wiring connections to be made. A step-down transformer for the incandescent lamp 144 may be provided in the cavity 154 if desired, although a step-down transformer is not used in the illustrated embodiment since the non-halogen lamp 144 operates from 120 volt AC line voltage.

As will be apparent from the foregoing description, the present invention provides an improved agglutination viewer in which adjustment of the magnifying mirror can be carried out quickly and easily without the need to manipulate mechanical clamps. The magnifying mirror can placed in one of an essentially infinite number of possible orientations in order to allow for optimum viewing of the sample tube under examination. By virtue of the magnetic holding force, the mirror is firmly and automatically held in the selected orientation without the need for any further action on the part of the user. The position and orientation of the illumination source can also be adjusted as desired, either by means of a flexible gooseneck and fiber optic cable in the embodiment of FIGS. 1–7, or by means of an articulated support structure in the embodiment of FIGS. 8–13. The embodiment of FIGS. 1–7 is advantageous in that the flexible gooseneck 36 can be manipulated into an unlimited number of possible positions and orientations, while the positional adjustments of the articulated lamp head structure used in the embodiment of FIGS. 8–13 are somewhat more limited. The embodiment of FIGS. 1–7 is also advantageous in that the flexible gooseneck 36 and lamp head 42 remain cool to the touch, given that the incandescent lamp is housed in the base portion 22 of the agglutination viewer 20. This arrangement has the additional advantage that, by virtue of the fiber optic cable used to transmit light from the base portion, the gooseneck 36 can be smaller in diameter (and hence more flexible) than would be the case if the gooseneck 36 were required to support the weight of an incandescent lamp, socket assembly and shade. The increase in flexibility of the gooseneck allows adjustments in the position and orientation of the lamp head to be made more easily by the user.

Although the present invention has been described with reference to certain preferred embodiments, it will be understood that the invention is not limited to the details of these embodiments. Various substitutions and modifications will occur to those of ordinary skill in the art, and all such substitutions and modifications are intended to be embraced within the scope of the invention as defined in the appended claims.

What is claimed is:

1. An apparatus for viewing agglutination of blood cells in a sample tube, said apparatus comprising:

a base portion;

a magnifying mirror carried by said base portion, said mirror being adjustable in orientation with respect to said base portion and being held in a desired orientation by magnetic attraction to said base portion; and an illumination device carried by said base portion for providing illumination to a sample tube while said sample tube is held in proximity to said mirror for viewing.

2. An apparatus as claimed in claim 1, wherein said mirror is retained in a desired orientation on said base portion by means of a magnet carried by at least one of said base portion and said mirror.

3. An apparatus as claimed in claim 2, wherein said base portion has a hollow interior, and wherein said magnet is disposed within said hollow interior.

4. An apparatus as claimed in claim 3, wherein:

said mirror is disposed in a cup-like member having a generally spherical outer surface;

said base portion is provided with an open cavity having generally spherical wall for receiving said cup-like member; and said magnet is disposed within the hollow interior of said base portion adjacent to said spherical wall of said cavity.

5. An apparatus as claimed in claim 4, wherein said magnet has a ring-like shape and is positioned approximately coaxially with respect to said cavity.

6. An apparatus as claimed in claim 4, wherein said cup-like member is made of a magnetically attractable material.

7. An apparatus as claimed in claim 1, wherein said illumination device comprises a lamp head adjustably supported with respect to said base portion by a flexible conduit.

8. An apparatus as claimed in claim 7, wherein said lamp head receives light from a light source contained within said base portion, said light source being optically coupled to said lamp head by a fiber optic cable contained within said flexible conduit.

9. An apparatus for viewing agglutination of blood cells in a sample tube, said apparatus comprising:

a base portion wherein said base portion contains a heat sink for dissipating heat from an incandescent lamp;

a magnifying mirror carried by said base portion, said mirror being adjustable in orientation with respect to said base portion; and an illumination device carried by said base portion for providing illumination to a sample tube while said sample tube is held in proximity to said mirror for viewing, said illumination device comprising:

a lamp head adjustably supported with respect to said base portion by a flexible conduit; and said incandescent lamps contained within said base portion and optically coupled to said lamp head by a fiber optic cable contained within said flexible conduit.

10. An apparatus as claimed in claim 9, wherein said heat sink surrounds said incandescent lamp during normal operation of said apparatus, said heat sink and said incandescent lamp being separable from each other to allow inspection of said lamp.

11. An apparatus as claimed in claim 10, wherein said heat sink is affixed to a removable part of said base portion.

12. An apparatus as claimed in claim 11, wherein said heat sink has a central aperture for receiving said incandescent lamp and one end of said fiber optic cable in a facing relationship, so that light from said lamp is coupled to said fiber optic cable.

13. An apparatus as claimed in claim 12, wherein said incandescent lamp is a tungsten halogen lamp.

14. An apparatus as claimed in claim 9, wherein said base portion contains an electrical circuit for said incandescent lamp, said electrical circuit including a step-down transformer.

15. An apparatus as claimed in claim 9, wherein said heat sink surrounds said incandescent lamp during normal operation of said apparatus, said heat sink and said incandescent lamp being separable from each other to allow replacement of said lamp.

16. An apparatus for viewing agglutination of blood cells in a sample tube, said apparatus comprising:

a base portion having an open cavity with generally spherical wall;

a cup-like member having a generally spherical outer surface conforming to said generally spherical wall of said cavity, said cup-like member being receivable in said cavity and further wherein said cup-like member is held in a desired orientation with respect to said base portion by magnetic force associated with the cup-like member and the base portion;

a magnifying mirror disposed in said cup-like member, wherein orientation of said mirror with respect to said base portion is adjustable by movement of said cup-like member within said cavity; and an illumination device carried by said base portion for providing illumination to a sample tube while said sample tube is held in proximity to said mirror for viewing.

17. An apparatus as claimed in claim 16, wherein said cup-like member is made of a magnetically attractable material, and wherein said base portion includes an internal magnet for retaining said cup-like member in said cavity.

18. An apparatus as claimed in claim 16, wherein said illumination device comprises a lamp head suspended over said base portion by a flexible conduit, a light source contained within said base portion, and a fiber optic cable within said flexible conduit for optically coupling said light source to said lamp head.

* * * * *